United States Patent Office 3,293,238
Patented Dec. 20, 1966

3,293,238
AZO DYESTUFFS CONTAINING A HALOGENATED TRIAZINE
Charles H. Chang, Easton, Pa., assignor to General Aniline & Film Corporation, New York, N.Y., a corporation of Delaware
No Drawing. Filed Dec. 30, 1963, Ser. No. 334,627
4 Claims. (Cl. 260—153)

This invention relates to new azo dyestuffs and more particularly to such dyestuffs containing a halogenated triazine radical which are highly useful in producing textile dyeings with improved properties.

According to the invention there are provided as new dyestuffs, compounds which in the free acid form are represented by the formula:

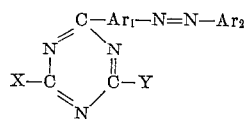

wherein X is selected from the group consisting of Cl and Br; Y is selected from the group consisting of Cl, Br and —Ar₁—N=N—Ar₂; Ar₁ is selected from the group consisting of monocyclic and polycyclic aryl radicals nuclearly substituted by at least one OH radical, at least one of such radicals being in ortho position relative to the azo bridge; and Ar₂ is the residue of a diazotizable primary aromatic amine containing at least one water solubilizing member of the group consisting of sulfonic and carboxylic acid radicals.

In the above formula, Ar₁ is preferably a benzene, naphthalene or anthracene radical but may also be an aryl radical containing more than three carbocycles some or all of which may be fused. It may also be a diphenyl radical or the like. The Ar₁ radical must contain at least one OH group in ortho position relative to the azo bridge and the remaining nuclear positions may or may not be substituted by OH groups. Generally, the Ar₁ radical will contain no more than four OH groups.

The Ar₂ radical is derived from a diazotizable primary aromatic amine of known type employed in the production of azo dyestuffs containing at least one sulfonic or carboxylic acid radical. In general, such compounds are benzene, naphthalene, anthracene, anthraquinone, benzophenone, benzosulfone, diphenylsulfone, diphenyl ether, carbazol, diphenyl urea, diphenyl, and benzanilide or other similar cyclic compounds containing at least one NH₂ and at least one carboxylic or sulfonic acid group.

The dyestuffs of the present invention are characterized by an unusually high reactivity with fibrous materials containing a reactive or labile hydrogen atom, good build-up, and excellent fastness properties when applied to such fibrous materials, particularly in the presence of an acid binding agent. They may in general be prepared by first reacting one mole of cyanuric chloride with one or two moles of a compound of the general formula H—Ar₁ by a Friedel-Crafts type reaction in the presence of aluminum chloride or other Friedel-Crafts catalysts. As examples of reactants of the formula H—Ar₁ which may be employed in this first step, there may be mentioned phenol, resorcinol, pyrocatechol, hydroquinone, pyrogallol, 1,2,4-benzenetriol, phloroglucinol, benzenetetrol, α-naphthol, β-naphthol, isomeric forms of naphthalenediol, anthrol, isomeric forms of anthracenediol. An essential characteristic of this reactant is that it contain at least one nuclear OH group and that at least two of the ortho and para positions relative to the nuclear OH group be unsubstituted whereby one such position will become bonded in this first step of the reaction to the triazine of the cyanuric chloride and the other position will be coupled to the subsequently applied diazo component Ar₂. The reaction medium of this first step is poured onto ice and precipitate filtered, washed and dried. The intermediate thus produced has the formula

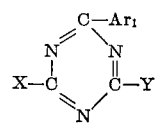

The intermediate of the above formula constitutes an azo coupling component and, according to the second step of the reaction for producing the dyestuffs of the present invention, is coupled in known manner with any desired diazo component containing at least one solubilizing sulfonic or carboxylic acid group. As representative of diazotizable primary aromatic amine compounds of the formula Ar₂—NH₂ which are useful in diazotized form in this step of the reaction, there my be mentioned orthanilic, metanilic, sulfanilic, 1-naphthylamine-2-sulfonic, 1-naphthylamine-3,6-disulfonic, 2-naphthylamine-5,7-disulfonic, 1-aminoanthraquinone-2-sulfonic, 4-aminodiphenyl or aminodiphenyl ether or aminodiphenyl sulfone-2-sulfonic, amino carbazol-2-sulfonic acids and the corresponding carboxylic acids. This primary aromatic amine is diazotized and coupled in known manner with the above mentioned intermediate to produce the dyestuffs of the present invention.

It is generally preferred to isolate the dyestuffs of the present invention from the medium in which they have been formed at a pH ranging from about 6 to 8 and it has been found that the loss of halogen from the triazine ring in the dyestuff can be minimized by addition of known buffering agents which give a pH value between 6 and 8. The buffering agents may be added at any stage during the manufacture of the dyestuff but it is preferred to add the buffering agent just before the dyestuff is isolated and to subsequently dry the dyestuff in the presence of the buffering agent. As examples of useful buffering agents which may be employed, there may be mentioned mixtures of disodium or dipotassium hydrogen phosphate with sodium or potassium dihydrogen phosphate, arylaminosulfonic acids such as sodium diethylmetanilate or its mixtures with sodium hydrogen sulfate, and the like. Optionally, the buffering agent may instead or also be admixed with the isolated dyestuff to improve its stability in storage and/or during application to the fibrous material.

The dyestuffs of the present invention are water soluble and highly reactive with fibers containing at least one reactive hydrogen atom by reason of the presence in the dyestuff of two reactive halogen atoms in the triazine ring. When the fiber contains amino groups, the dyeing (including printing) process may be carried out under acidic conditions whereas with fibers such as cellulose containing hydroxyl groups, the application should be carried out in the presence of an acid binding agent. Such acid binding agent may be an alkaline material such as sodium or potassium hydroxide, carbonate, bicarbonate, phosphate or the like and may be applied to the fibrous material prior to, simultaneously with or after application of the dyestuff. The dyestuff is generally applied in aqueous medium containing if desired a water miscible solvent such as acetone, alcohol, dioxane, dimethyl-formamide, or the like and other known adjuvants such as solution aids like urea and thiodiglycol, migration inhibitors such as cellulose ethers, sodium chloride, sodium sulfate and other salts, wetting agents preferably of the nonionic surface active type, and thickening agents for the production of printing pastes such as methyl cellulose, starch gum arabic, gum tragacanth, locust bean gum, sodium alginate, and the like. Instead of an alkaline acid binding agent of the type described above, a substance may be employed which liberates an acid binding agent upon subsequent subjection to elevated temperatures. An example of such a substance is sodium trichloro acetate and use of such a substance requires subsequent application of elevated temperatures as by dry heat or steam.

The dyestuff is generally applied to the fibrous material at or about room tempertaures due to its highly reactive nature, but elevated temperatures may be employed. Applictaion may be in any desired manner, as by continuous or batch methods and by immersion, roller application, padding, spraying, brushing, printing, or the like. The fibrous material may be allowed to remain in the dye-containing medium until the coloring process is completed, or the fibrous material impregnated with the dye-containing medium may be wound on a roller with alternating sheets of polyethylene or similar plastic film and/or the entire roll wrapped in such a film, and the wrapped package held at room temperature or slightly higher until completion of the desired reaction between the fiber and the dyestuff.

The present dyestuffs have been found to be highly effective for dyeing and printing cellulose fibers of natural or synthetic type such as cotton, linen, wood, paper, regenerated cellulose and the like. As representative of other fibrous materials which may be colored by the present dyestuffs, there may be mentioned natural and synthetic protein fibers such as wool, silk, leather, animal hides and skins, casein, and zein, polyamides such as the 6-, and 6,6-nylons and polypyrrolidone, polyurethanes, polyesters, copolymers or homopolymers containing recurring carboxylic or cyano groups, polyvinyl alcohol, partially hydrolyzed cellulose acetate and polyvinyl acetate, polyvinyl chloride, and mixtures, copolymers and graft copolymers thereof. Mixed fabrics and fibers may likewise be so treated.

The fibers may be in any of the usual forms and in natural bulk, interwoven, knitted or felted form as for example in the form of staple fiber or continuous filaments in bulk form or in the form of tow, rope, yarns, slubbings, warps, fabrics, felts, and the like, and treated as a wound package, running length, fibrous stock, bulk, etc. Further, although this invention has been described for use in the coloration of fibrous material, it will be understood that these dyestuffs may be employed for dyeing other articles including film and sheet material, and other objects of any size, shape and configuration without departing from the spirit and scope of this invention.

The following examples are only illustrative of the present invention and are not to be regarded as limitative. All parts and proportions referred to herein and in the appended claims are by weight unless otherwise indicated.

*Example 1*

(a) To a flask containing 11 g. (0.1 mole) of resorcinol, and 18.5 g. (0.1 mole) of cyanuric chloride in 80 ml. of dry benzene is added in portions 13.4 g. (0.1 mole) of aluminum chloride with stirring without external heating for 2 hours. The temperature goes up spontaneously to 45° C. at the beginning of the reaction. After reaction for two hours at room temperature, the benzene layer is decanted and the residue is poured onto 300 g. of ice with stirring for ½ hour. The precipitate is then filtered, washed with cold water and dried at room temperature under reduced pressure overnight. The resulting intermediate, 2 - (2',4'-dihydroxyphenyl)-4,6-dichlorotriazine, is obtained in the form of 15 g. of a yellow powder.

(b) Three grams of the above coupling component intermediate so obtained is suspended in sodium carbonate solution at 0°–5° C. To the alkaline suspension is added metanilic acid diazonium salt prepared from 2 g. of the amino acid to form a yellow dye. The dye is salted out, dried at room temperature under reduced pressure, and weighs 8 g. It has the formula

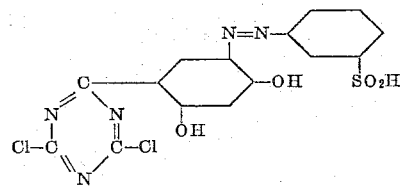

(c) The dye is dissolved in sodium carbonate solution, padded on cotton cloth and heat cured 3 mins. at 150° C. to give a brownish yellow shade on the cloth which is fast to washing and boiling in nonionic detergent. The product also dyes the cotton cloth in a dye bath at room temperature.

*Example 2*

Following the procedure of Example 1(a) the reaction of 22 g. (0.2 mole) of resorcinol, 18.5 g. (0.1 mole) of cyanuric chloride and 26.8 g. (0.2 mole) of aluminum chloride in 200 ml. of dry benzene gives the expected bis-(dihydroxyphenyl)monochlorotriazine as an intermediate.

A yellow dye is obtained from the coupling reaction of orthanilic acid diazonium salt and the above bis(dihydroxyphenyl)monochlorotriazine in a mole ratio of 2:1. The dye has the following structure:

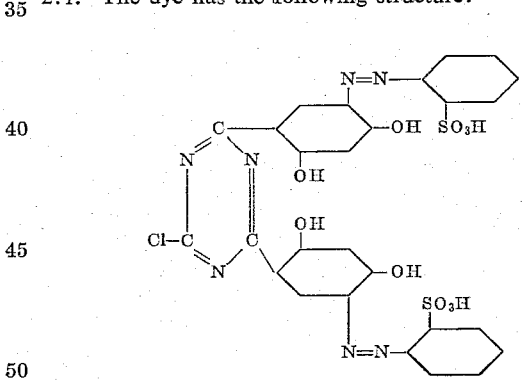

This product dyes cotton cloth in dark yellow shade with good fastness to washing.

*Example 3*

Following the procedure of Example 1 (a), the reaction of 14.4 g. of α-naphthol (0.1 mole), 18.5 g. (0.1 mole) of cyanuric chloride and 13.4 g. (0.1 mole) of aluminum chloride in 120 ml. of benzene gives 2-(4'-hydroxynaphthyl)-4,6-dichlorotriazine as an intermediate.

The above intermediate is coupled with sulfanilic acid diazonium salt in the mole ratio of 1:1 to give an orange dye which has the following structure:

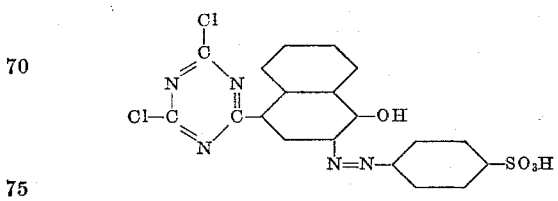

This product dyes cotton cloth in orange shade with good fastness to wash and to light.

This invention has been disclosed with respect to certain preferred embodiments, and it will be understood that modification and variations thereof will become obvious to persons skilled in the art and are intended to be included within the spirit and purview of this application and the scope of the appended claims.

I claim:

1. A compound of the formula:

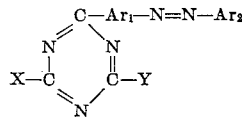

wherein X is Cl or Br; Y is Cl, Br or —Ar$_1$—N=N—Ar$_2$; Ar$_1$ is a benzene, naphthalene, anthracene, or diphenyl radical nuclearly substituted by 1 to 4 OH groups, at least one of such groups being in ortho position relative to the azo bridge; and Ar$_2$ is the residue of a diazotizable primary aromatic amine containing at least one water solubilizing sulfonic or carboxylic acid group.

2. A compound of the formula:

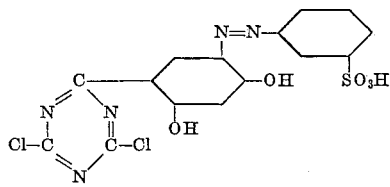

3. A compound of the formula:

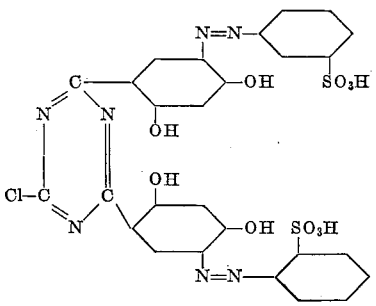

4. A compound of the formula:

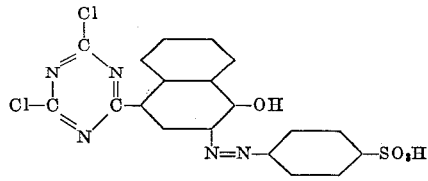

References Cited by the Examiner

UNITED STATES PATENTS 1,886,480  11/1932  Haller et al. _____ 260—153

FOREIGN PATENTS 458,313  7/1949  Canada.

CHARLES B. PARKER, *Primary Examiner.*

JOSEPH P. BRUST, *Examiner.*

D. M. PAPUGA, *Assistant Examiner.*

UNITED STATES PATENT OFFICE
CERTIFICATE OF CORRECTION

Patent No. 3,293,238                      December 20, 1966

Charles H. Chang

It is hereby certified that error appears in the above numbered patent requiring correction and that the said Letters Patent should read as corrected below.

Column 1, line 72, for "triazine" read -- triazine ring --; column 4, lines 8 to 14, for that portion of the formula reading "$\overset{|}{S}O_2H$" read -- $\overset{|}{S}O_3H$ --.

Signed and sealed this 28th day of January 1969.

(SEAL)
Attest:

Edward M. Fletcher, Jr.                        EDWARD J. BRENNER
Attesting Officer                              Commissioner of Patents